United States Patent
Krolski et al.

(10) Patent No.: US 6,851,038 B1
(45) Date of Patent: Feb. 1, 2005

(54) BACKGROUND FETCHING OF TRANSLATION LOOKASIDE BUFFER (TLB) ENTRIES

(75) Inventors: Duane F. Krolski, Gilbert, AZ (US); James J. Jirgal, Chandler, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/580,333

(22) Filed: May 26, 2000

(51) Int. Cl.[7] .............................................. G06F 12/10
(52) U.S. Cl. ...................... 711/207; 711/205; 711/213; 711/137
(58) Field of Search ................................ 711/207, 205, 711/206, 208, 137, 213

(56) References Cited

U.S. PATENT DOCUMENTS

| | | | | |
|---|---|---|---|---|
| 4,797,814 A | * | 1/1989 | Brenza ........................... | 711/3 |
| 5,307,477 A | * | 4/1994 | Taylor et al. .................. | 711/3 |
| 5,345,576 A | * | 9/1994 | Lee et al. ..................... | 711/122 |
| 5,465,337 A | | 11/1995 | Kong | |
| 5,555,395 A | | 9/1996 | Parks | |
| 5,640,533 A | | 6/1997 | Hays et al. | |
| 5,696,927 A | | 12/1997 | MacDonald et al. | |
| 5,712,998 A | | 1/1998 | Rosen | |
| 5,752,274 A | * | 5/1998 | Garibay, Jr. et al. ......... | 711/122 |
| 5,825,878 A | | 10/1998 | Takahashi et al. | |
| 6,105,113 A | * | 8/2000 | Schimmel ................... | 711/144 |
| 6,249,853 B1 | * | 6/2001 | Porterfield .................. | 345/568 |

* cited by examiner

Primary Examiner—Matthew D. Anderson
(74) Attorney, Agent, or Firm—Michael J. Ure

(57) ABSTRACT

A computer system is provided with a memory management unit (MMU) utilizing a translation look-aside buffer (TLB) arrangement. The computer system includes a bus, a unified cache memory, a main memory, a processor, and a memory controller. The TLB is configured for storing code and/or data. The main memory is coupled to the bus. The main memory contains descriptor tables for mapping virtual-to-physical address translations within a virtual memory system. The processor is coupled to the bus and the unified cache memory. The processor is configured to communicate and sequentially move through the main memory to retrieve a line of information from the main memory for storage in the unified cache memory. The cache is configured for storing the most recently retrieved code and data from main memory. The memory controller is coupled between the bus and the main memory. The memory controller is operative to enable the processor to retrieve the information in the form of descriptor page table entries for the translation lookaside buffer (TLB), or code and/or data for the unified cache memory. A method is also provided.

4 Claims, 4 Drawing Sheets

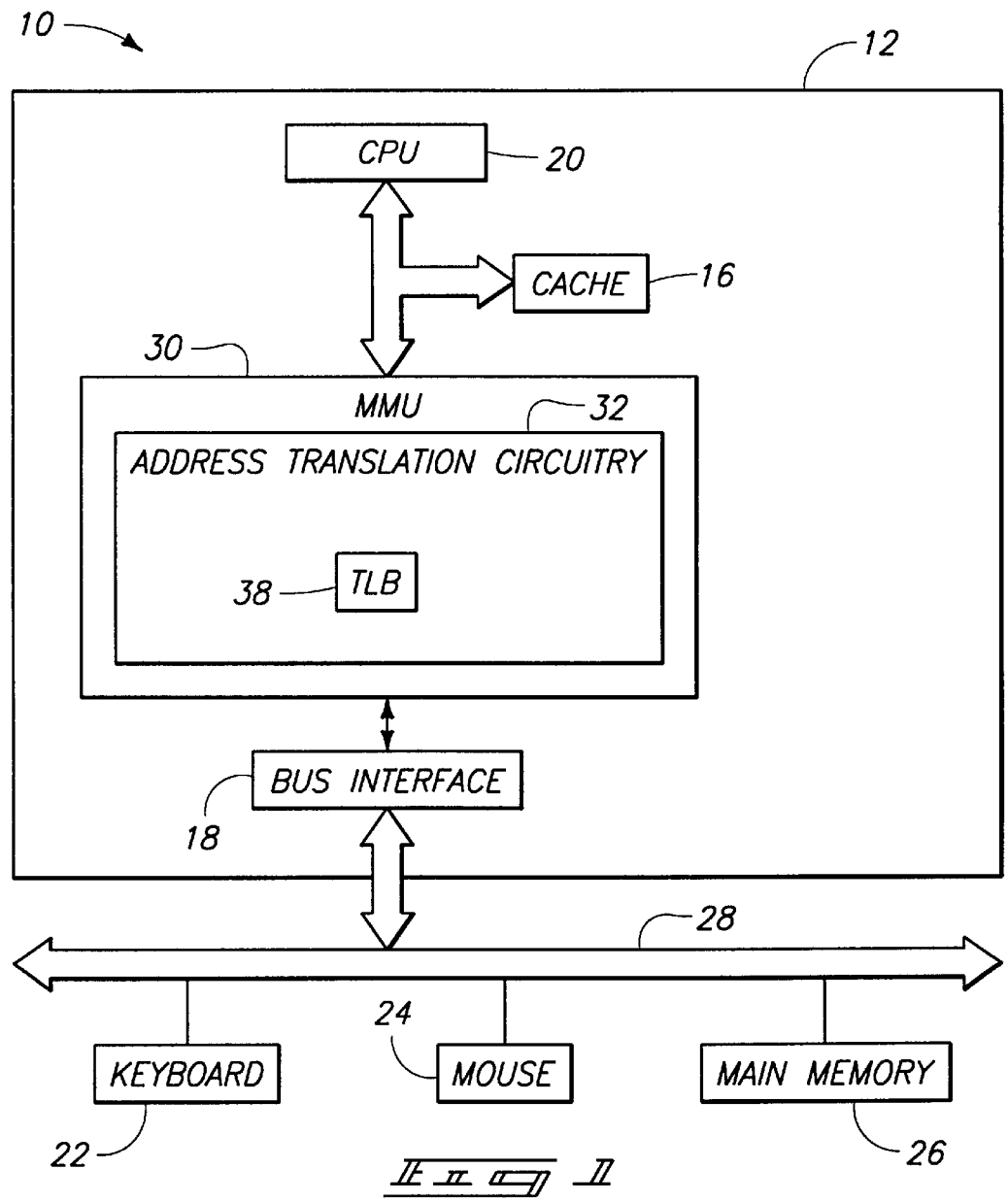
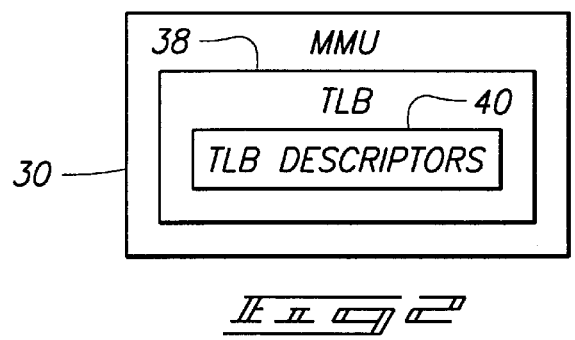

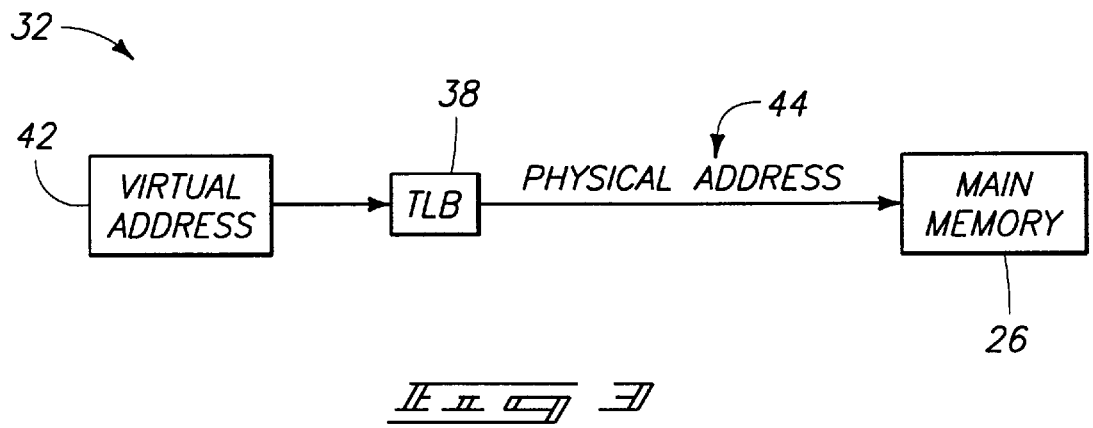
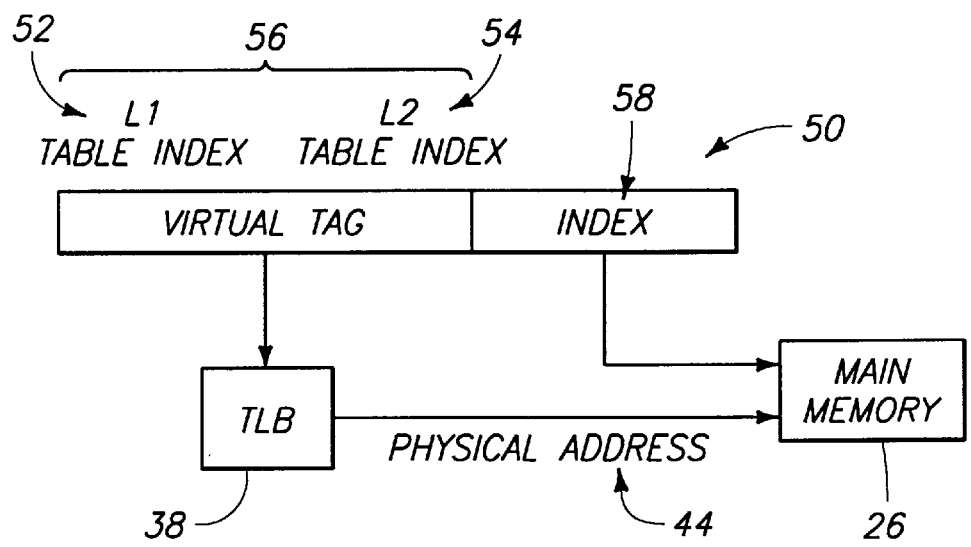

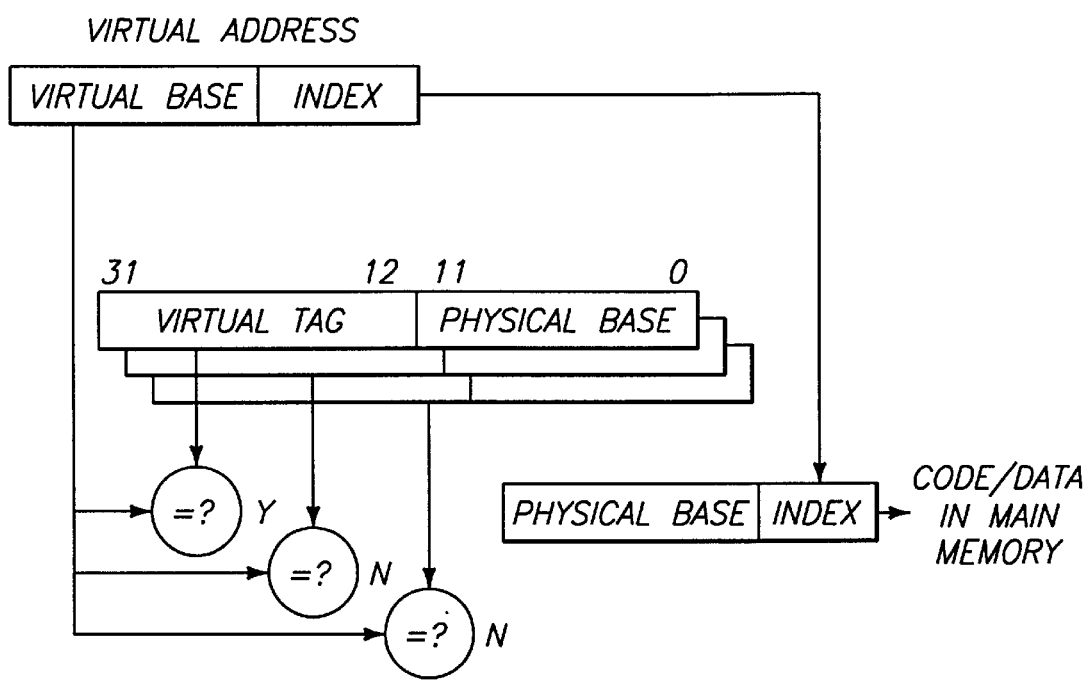

BACKGROUND FETCHING OF TRANSLATION LOOKASIDE BUFFER (TLB) ENTRIES

TECHNICAL FIELD

This invention pertains to memory management. More particularly, this invention relates to the fetching of translation lookaside buffer (TLB) descriptors from memory so as to minimize the impact on system performance.

BACKGROUND OF THE INVENTION

The development of computer systems and the corresponding increase in the complexity of complex and relatively large software applications has placed increasing demands on the performance of these computer systems. As a result, many techniques have been implemented in an effort to increase computer system performance.

In order to meet the increasing demands placed on computer systems, the amount of addressable memory available on a computer system has been significantly increased. This increase enables a computer to handle more complex software programs, and to handle more information. Concurrently, the operating speed of the computer increases which enables larger programs to run relatively efficiently.

One particular technique for increasing the addressable memory of a computer system is to provide a virtual memory system. Large amounts of memory can be addressed with a virtual memory system by sharing a smaller amount of physical memory among many processes by dividing physical memory into blocks and allocating the blocks to different processes. A CPU produces virtual addresses that are translated via hardware and software to physical addresses, which can be used to access main memory via a process of memory mapping. A virtual memory systems enables the addressing of large amounts of memory as if they were part of the computer system main memory, even where the actual physical main memory provides substantially less storage space than is addressable.

Virtual memory systems use a virtual memory addressing system with a memory management unit (MMU) to translate virtual memory addresses into physical memory addresses where actual information is located.

Memory management units include address translation circuitry. The address translation circuitry translates a virtual address into a physical address. The resulting physical address is then used to access the originally requested memory location. Pursuant to some implementations, the memory management unit references in main memory two levels of descriptor tables for translating the virtual address into a physical address; namely, a Level 1 descriptor table and multiple Level 2 descriptor tables. An internal register, or Translation Base Register, contains the physical starting address of the Level 1 descriptor table.

Each Level 1 descriptor table entry points to a Level 2 descriptor table. A memory management unit (MMU) uses information from the Level 1 descriptor to retrieve the Level 2 descriptor. The Level 2 descriptor contains the physical address information required to translate the virtual address to a physical address. With this descriptor structure, every virtual memory access to main memory must first be preceded by two descriptor retrievals before the physical address can be derived and the main memory access can continue.

Descriptor tables can be configured in layers, or levels, and a significant amount of system clock time can be involved in trying to retrieve physical page addresses via the descriptor tables stored in a main memory. These physical page addresses are then used by a processor to access specific desired information. However, a significant amount of clock cycles are required to perform such a search which imparts significant and undesirable delay.

Therefore, cache-like memories in the form of translation lookaside buffers (TLBs) are often provided in memory management units in order to alleviate delays. A translation lookaside buffer (TLB) is a cache that is used to keep track of recently used address mappings so that time-consuming accesses to descriptor tables in main memory can be avoided. Accordingly, the TLB only holds descriptor table mappings, with a tag entry in the TLB holding a virtual page number, and each data entry in the TLB holding a physical page number. Typically, most recently used addresses are the most likely to be used. One algorithm implementation replaces TLB entries that are Least Recently Used (LRU), and another algorithm implementation keeps TLB entries that are Most Recently Used (MRU).

In operation, when a processor provides a virtual address whose page is presently stored in the TLB, the TLB quickly provides a physical page address for the information, which eliminates the need for the memory management unit (MMU) to spend several clock cycles accessing the descriptor tables in main memory. This occurrence is often referred to as a "TLB hit". However, when a virtual page address is sent to the TLB, but is not found in the TLB, the memory management unit (MMU) has to access the descriptor tables in main memory which requires many more clock cycles. This is referred to as a "TLB miss". The process by which the memory management unit (MMU) accesses descriptor tables in main memory for the purpose of updating the TLB is referred to as a "TLB fetch".

ARM processors, or central processing units, and microcontrollers, available from Advanced RISC Machines (ARM), exist for use with a variety of handheld computing and communications products. The subsystem surrounding the processor includes a unified cache, a memory management unit (MMU), and a write buffer. In such products, the ARM processor is required to make requests to memory. More particularly, these requests take the form of checking with the memory management unit (MMU), both with virtual addresses and physical addresses. The memory management unit (MMU) is operative to support virtual memory. The unified cache is operative to store instructions and data, which enables the CPU to continuously execute code and process data without accessing main memory until a cache miss is encountered. The cache thereby contributes to improved performance and reduces memory bandwidth requirements.

Even though the use of a TLB may increase the speed of virtual-to-physical address translation, a TLB miss still causes the memory management unit (MMU) to access the descriptor tables in main memory. These descriptor table lookups detrimentally affect system performance by reducing the central processing unit's instruction and data throughput.

Therefore, there exists a need for further improvements to techniques for fetching TLB entries, or reducing the occurrence of TLB fetching while a central processing unit (CPU) is waiting for code and/or data.

SUMMARY OF THE INVENTION

An apparatus and method are provided for background fetching of translation lookaside buffer (TLB) entries. The fetching of TLB descriptors from memory by implementing a background processing of TLB descriptors enhances system performance by minimizing operating delays that are caused by the memory management unit (MMU) halting operation of the microprocessor while retrieving TLB descriptors.

According to one aspect of the invention, a computer system is provided with a memory management unit (MMU) utilizing a translation look-aside buffer (TLB) arrangement. The computer system includes a bus, a unified cache memory, a main memory, a processor, and a memory controller. The TLB is configured for storing code and/or data. The main memory is coupled to the bus. The main memory contains descriptor tables for mapping virtual-to-physical address translations within a virtual memory system. The processor is coupled to the bus and the unified cache memory. The processor is configured to communicate and sequentially move through the main memory to retrieve a line of information from the main memory for storage in the unified cache memory. The cache is configured for storing the most recently retrieved code and data from main memory. The memory controller is coupled between the bus and the main memory. The memory controller is operative to enable the processor to retrieve the information in the form of descriptor page table entries for the translation lookaside buffer (TLB), or code and/or data for the unified cache memory.

According to another aspect of the invention, a method is provided for processing translation lookaside buffer (TLB) entries. The method includes: providing a system cache, a main memory, a central processing unit (CPU), and a memory management unit having a translation lookaside buffer (TLB); storing most recently used code and/or data in the system cache; storing addresses in the form of virtual-to-physical translations for most recent address translations from one address to another address of the most recently used code and/or data; fetching information from the memory with the processor; executing the fetched information; retrieving code and/or data from the system cache with the processor; and in combination with retrieving the code and/or data from the system cache, retrieving address translations from the main memory with the memory management unit.

BRIEF DESCRIPTION OF THE DRAWINGS

Preferred embodiments of the invention are described below with reference to the following accompanying drawings.

FIG. 1 is a functional block diagram illustrating a computer system configured to implement background fetching of translation lookaside buffer (TLB) entries according to the present invention.

FIG. 2 is a simplified block diagram of a memory management unit (MMU) architecture containing a TLB with TLB descriptors.

FIG. 3 is a simplified block diagram of virtual-to-physical translation circuitry.

FIG. 4 is a simplified block diagram of the mapping of a virtual address to a physical address.

FIG. 6 is a simplified block diagram of a mapping of a virtual address to a physical address using a translation lookaside buffer (TLB) entry.

DETAILED DESCRIPTION OF THE PREFERRED EMBODIMENTS

Figure 5:
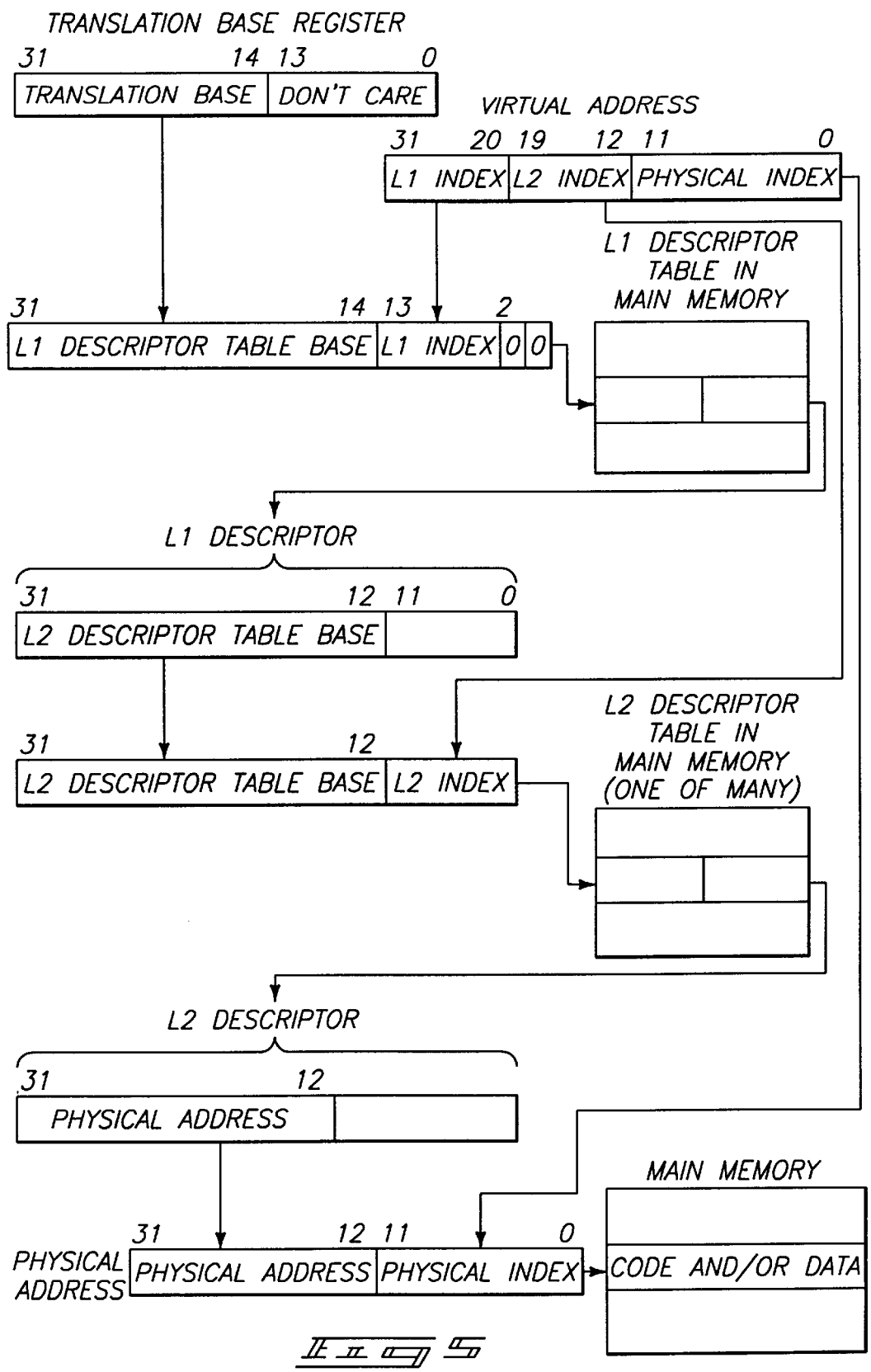
FIG. 5 is a simplified block diagram of a mapping from a translation base register to a physical address within the main memory.

This disclosure of the invention is submitted in furtherance of the constitutional purposes of the U.S. Patent Laws "to promote the progress of science and useful arts" (Article 1, Section 8).

Referring now to FIG. 1, a block diagram illustrates a computer system configured to implement features of Applicant's invention and identified by reference numeral 10. Computer system 10 includes a processor subsystem 12, user interfaces such as a keyboard 22 and a mouse 24, main memory 26, and a system bus 28. Processor subsystem 12 includes a memory management unit (MMU) 30, cache 16, and bus interface 18.

A central processing unit (CPU) 20 communicates with memory management unit (MMU) 30. MMU 30 includes address translation circuitry 32 that performs address translation from a virtual page number to a physical page number wherein virtual addresses are translated to physical addresses.

MMU 30 includes a translation lookaside buffer (TLB) 38 that stores recently used address mappings in order to avoid accesses to descriptor tables in main memory. TLB fetches are relatively expensive time-wise. Therefore, it is desirable to minimize the number of times this occurs. Accordingly, it is desirable to maximize the number of TLB hits that occur as CPU 20 accesses memory to execute code and manipulate data.

FIG. 2 illustrates an architecture for MMU 30 containing TLB 38 with TLB descriptors 40. More particularly, MMU 30 implements background fetching of TLB descriptors 40 which means that MMU 30 performs fetching of TLB descriptors 40 in the background while CPU 20, such as an ARM processor, performs another fetch out of cache 16 (of FIG. 1). The fetching of TLB descriptors 40 by MMU 30 takes a significant amount of time. Hence, background fetching of TLB descriptors 40 by MMU 30, in parallel with CPU 20 performing fetches out of cache 16 (of FIG. 1), results in future retrievals from memory by CPU 20 being as efficient as possible. Accordingly, instruction/throughput is increased and total execution time is decreased.

A background TLB fetch is prompted when CPU 20 accesses code or data at an address in a virtual page that results in a "cache hit" and a "TLB miss". MMU 30 will retrieve the required descriptors and update a TLB entry in the background while CPU 20 continues to operate from the cache. Future accesses to that page which result in a cache miss will avoid the time-consuming process of a new TLB fetch and proceed immediately to service the cache miss.

FIG. 3 illustrates address translation circuitry 32. More particularly, address translation circuitry 32 includes virtual address 42, TLB 38, and a physical address line 44 used to address main memory 26. Main memory 26 contains code and data necessary for operation of CPU 20, but only addressable with physical addresses. A virtual address, provided by a program, is translated to a physical address by the address translation circuitry 32. The physical address identifies the real address which locates the item of code or data within the main memory. A number of different addressing schemes are known in the art for performing such translation, depending on the computer architecture being implemented.

TLB 38 comprises a cache of 32 virtual tag/physical address pairs of the most recent virtual-to-physical address translations which have been identified from a currently executing task. In operation, a portion of virtual address 42 is compared with the virtual tag entries in TLB 38. The page table entries within TLB 38 each contain a virtual tag/physical address pair for individual pages that are actually stored within main memory 26. A TLB "hit" occurs when a virtual tag portion of address 42 matches the virtual tag of a TLB entry. For the case of such a "hit", a desired physical address is located directly within TLB 38. A TLB "hit" is beneficial because the memory management unit (MMU) does not have to fetch a new Level 1/Level 2 (L1/L2) descriptor pair in order to translate the present virtual address. However, such benefit is only realized when a TLB "hit" occurs. When a hit does NOT occur, there is actually a loss of speed which is detrimental to system performance because the virtual address cannot be translated until a new Level 1/Level 2 (L1/L2) descriptor pair is fetched before the present CPU operation may continue. It is such loss which the present invention is directed to overcome, which reduces the likelihood that the CPU must wait for a virtual address to a physical address translation.

For cases where a TLB "hit" does not occur (i.e., a "TLB miss"), MMU 30 must perform a TLB fetch before the virtual-to-physical address translation occurs. Typically, a two level translation implementation is used. Further details of such translation are described below with reference to FIG. 4.

FIG. 4 illustrates the mapping of a virtual address to a physical address via TLB 38 using address translation circuitry (ATC) 32 (of FIG. 1). More particularly, a virtual address 50 includes a virtual tag 56 and an index 58. Virtual tag 56 is the virtual tag portion of a TLB entry. A first portion of virtual address 50, a Level 1 index, is used to index an entry in the Level 1 (L1) descriptor table. The Level 1 (L1) descriptor table comprises a table of pointers to individual Level 2 (L2) descriptor tables. As an example, for an ARM 710 processor subsystem, the upper-most 12 bits of the virtual address are used to provide an index into the Level 1 (L1) descriptor table.

The next eight bits (19:12) of the virtual address are concatenated with the upper 20 bits (31:12) of the Level 1 (L1) descriptor to provide an address to a Level 2 (L2) descriptor. This L2 descriptor contains the physical base address which is concatenated with the remaining 12 bits (11:0) of the virtual address to form the full 32-bit physical address. The physical base address contained in the L2 descriptor is the physical base address portion of a TLB entry.

According to one implementation, CPU 20 of FIG. 1 comprises a device that, in general, sequentially executes through memory periodically. One such device is provided by an ARM processor available from Advanced RISC Machines (ARM), of Cambridge, England (see http://www.arm.com). TLB 38 is provided within MMU 30 as also shown in FIG. 1. System cache 16 comprises a fast local memory which contains most recently used code and/or data. Main memory 26 contains code and/or data which is accessed via bus 28 via real physical addresses. In contrast, cache memory 16 contains most recently used code and/or data, accessed via a virtual address. In other words, accesses to main memory require a virtual-to-physical translation via a TLB lookup, while cache accesses do not require a TLB lookup.

CPU 20, in the form of an ARM microprocessor, controls execution of software that makes a request to main memory 26. The processor puts out a virtual address to fetch an instruction, thereby requiring a virtual-to-physical translation.

TLB descriptors are not stored in cache. Instead, the TLB is a "cache" for the L1/L2 descriptors. MMU 30 translates virtual addresses to physical addresses, and checks for error conditions that are unique to a particular implementation. More particularly, TLB 38 comprises 32 entries of virtual tag/physical base pairs. The virtual tag is replaced with the physical base to form the physical address that forms a byte address within a page. In operation, address translation is carried out from a virtual page number to a physical page number. The high part of virtual address presented by CPU 20 is compared with the virtual tags of the 32 TLB entries. The entry with a matching virtual tag then outputs its corresponding physical base. The low part of the virtual address, the index, is concatenated with the physical base to form the physical address.

TLB 38 holds address translations for address translations that have been most recently performed. According to the present implementation, for performance reasons, MMU 30 (of FIG. 1) implements a rotational design which replaces TLB entries with new entries regardless of "in use" demand. That is, MMU 30 can replace a TLB entry even though there is a high probability that such entry will be used again. In contrast, other techniques implement a "least recently used" (LRU) or "most recently used" (MRU) algorithm for a TLB which eliminates TLB entries based upon "in use" demand. An LRU eliminates the least recently used TLB entries. An MRU keeps the most recently used TLB entries.

As shown in FIG. 3, TLB 38 associates a virtual address, by way of a virtual tag, with a physical address, by way of a physical base, using descriptors. Accordingly, TLB 38 acts as a cache that holds a finite number of the most recent virtual address translations.

In operation, each virtual address 50 is correlated with an associated physical address 44 via TLB 38. The ARM microprocessor (or CPU 20 of FIG. 1) requires a line of information from system memory (here, main memory 26 in FIG. 1). With a TLB miss, MMU 30 will inhibit the operation of the microprocessor and cache, retrieve the TLB descriptors, check validity of the TLB descriptors, and store the TLB descriptors in TLB 38. MMU 30 releases the cache 16, which causes cache 16 (of TLB 38) to retrieve a line of information for use by the microprocessor and store the retrieved information into memory within cache 16 for future use.

If microprocessor (processing circuitry 20) requires new information that is not in cache 16, and requires a virtual-to-physical translation not stored in the TLB, the above-described process is repeated, replacing the current entry in TLB 38 with a new entry. At such point in time, cache 16 will have both the "original" information associated with the replaced TLB entry and the "new" information associated with the replacing TLB entry. At this point in time, the microprocessor can access the "original" information, and cache 16 provides this "original" information without having to go to TLB 38 to perform another address translation.

During such operation, TLB 38 monitors the activity of the microprocessor (processing circuitry 20). Hence, the microprocessor is being concurrently used to do something useful at the same time the TLB is retrieving descriptors (hereinafter referred to as background fetching of TLB descriptors). While the microprocessor is getting information from cache 16, TLB 38 can retrieve the TLB descriptors, verify validity of the TLB descriptors, and store the TLB descriptors without inhibiting or affecting the operation of the microprocessor. Hence, the TLB contains required information for cache 16 in the event cache 16 needs to retrieve more information from memory 26.

As CPU 20 accesses instructions and data from the cache as well as from system memory, it may happen that some cached instructions/data may no longer have an associated TLB entry. When an access to such instructions/data occurs, the TLB indicates a miss and the memory management unit (MMU) 30 fetches from system memory the Level 1/Level 2 (L1/L2) descriptors which would define the virtual-to-physical translation of that cache access. This TLB fetch is made in anticipation of a cache miss that is made to the same virtual page as the previous cache hits that caused a TLB miss. When such a cache miss occurs, CPU 20 is spared the expense of waiting for a new TLB fetch before the cache gets its new instructions/data and CPU 20 may continue its operation. The process describing a TLB fetch while CPU 20 is still executing out of cache is called "background TLB fetching".

Following is one simple example of the sequence of steps realized when performing background fetching of TLB entries. The example illustrates a logic flow diagram showing the steps taken for background fetching of translation lookaside buffer (TLB) entries as performed according to the presently preferred embodiment of the invention.

TABLE 1

Background Fetching of TLB Entries

| Step 1 | Cache empty TLB empty | | |
|---|---|---|---|
| Step 2 | CPU attempts to access code/data in virtual page A. | TLB miss | Cache miss |
| Step 3 | MMU database descriptors for page A | TLB fetch | |
| Step 4a | Cache line fill of code/data from page A | TLB hit | Cache miss |
| Step 4b | Processor accesses code/data in cache | | Cache hit |
| Step 5 | Processor accesses other virtual pages such that TLB entry corresponding to page A is replaced. | | |
| Step 6 | Processor returns to virtual page A code/data that still in cache. | TLB miss | Cache hit |
| Step 7 | TLB recognizes miss and executes background fetch while processor still executes out of cache. | TLB background fetch | Cache hit |
| Step 8 | Processor attempts to access code/data from page A that is not in cache. | TLB hit | Cache miss |
| Step 9a | Cache line fill of code/data | TLB hit | Cache miss |
| Step 9b | Processor accesses code/data in cache. | | Cache hit |

Without background TLB fetching, Step 7 is skipped on a TLB miss/cache hit. When proceeding to Step 8, the TLB indicates a miss and a step similar to Step 3 must occur before proceeding to Step 9. Therefore, the avoidance of Step 3 is the benefit of the invention.

FIG. 6 is a diagram illustrating N parallel comparisons of virtual base to virtual tag of each valid TLB entry. An associated physical base of the matching virtual tag is concatenated with the index of virtual address to create the physical address. Virtual address bits 31:12 comprise a virtual tag portion of physical page base address of Level 2 (L2) descriptor including a physical base portion of a TLB entry.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A translation lookaside buffer (TLB) background processor, comprising:

a memory management unit (MMU) (30) providing for background fetching of TLB descriptors (40) from a main memory (26) while a host processor CPU (20) is otherwise occupied accessing a private cache memory (16) during a cache-hit cycle;

a circuit (32) for detecting when both a cache-hit cycle has occurred between said CPU (20) and cache memory (16), and a TLB-miss cycle has occurred between the CPU (20) and MMU (30), and providing for a TLB background access request in such event; and a circuit (32) responsive to said TLB background access request, and providing for fetching of TLB descriptors (40) for those pages of main memory represented by said cache-hit cycle.

2. The TLB background processor of claim 1, wherein:

the MMU (30) is a rotational type that replaces TLB entries with new entries regardless of in-use demand.

3. A method for operating a computer system with a cache memory and a translation lookaside buffer (TLB), comprising:

background fetching of TLB descriptors (40) by a memory management unit (MMU) (30) from a main memory (26) while a host processor CPU (20) is otherwise occupied accessing a private cache memory (16) during a cache-hit cycle;

detecting when both a cache-hit cycle has occurred between said CPU (20) and cache memory (16), and a TLB-miss cycle has occurred between the CPU (20) and MMU (30), and providing for a TLB background access request in such event;

fetching of TLB descriptors (40) for those pages of main memory represented by said cache-hit cycle.

4. The method of claim 3, further comprising:

replacing TLB entries with new entries regardless of in-use demand in said MMU (30) in a rotational scheme.

* * * * *